Dec. 2, 1952         D. H. KING         2,620,232
LAWN SPRINKLER
Filed March 10, 1950         2 SHEETS—SHEET 1
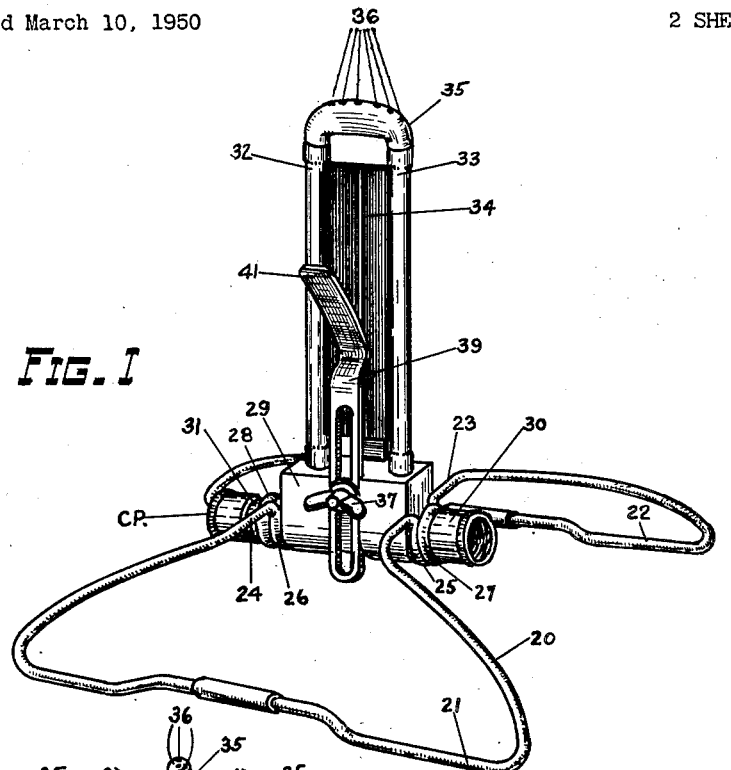
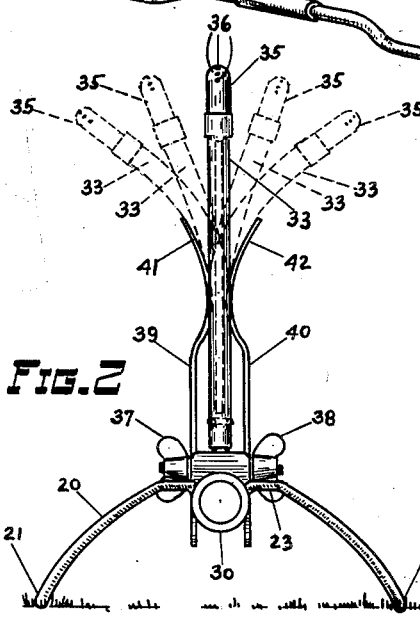
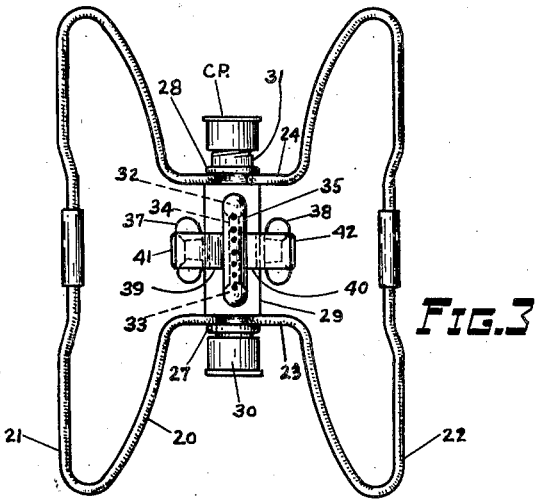
INVENTOR
D. H. KING
BY
ATTORNEY Dec. 2, 1952  D. H. KING  2,620,232
LAWN SPRINKLER
Filed March 10, 1950  2 SHEETS—SHEET 2
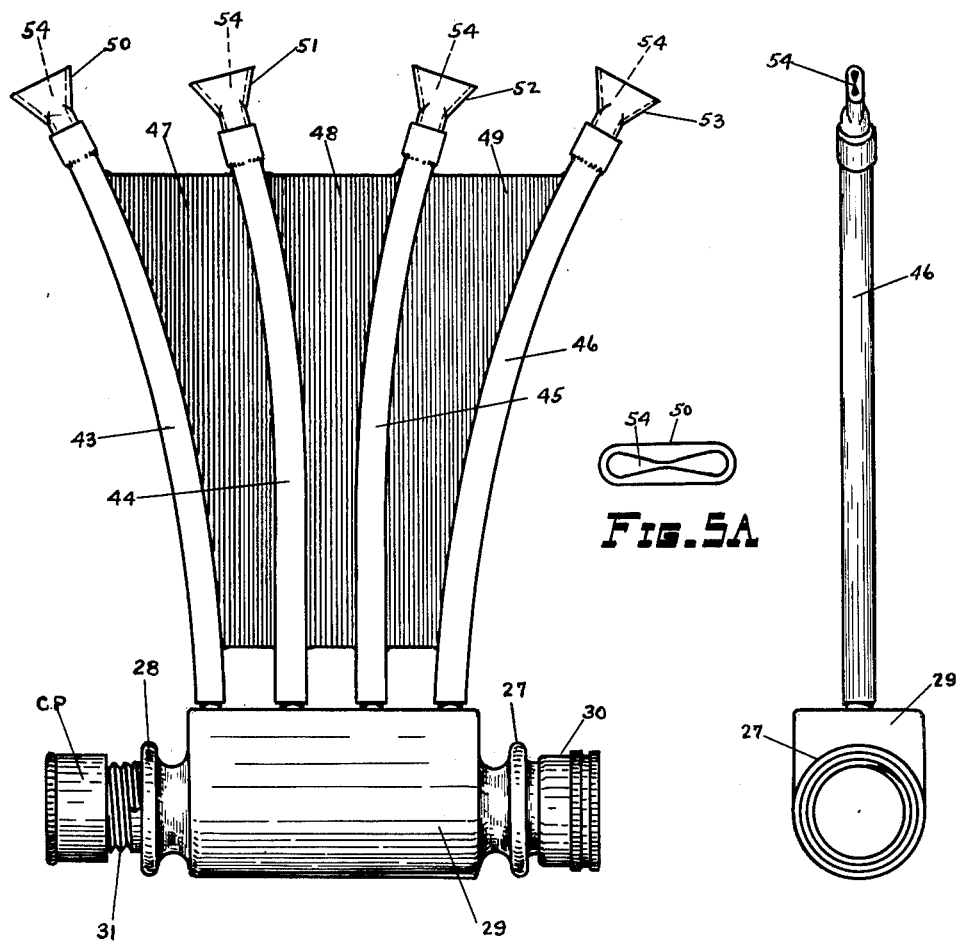
INVENTOR
D. H. KING
BY
ATTORNEY Patented Dec. 2, 1952

2,620,232

UNITED STATES PATENT OFFICE 2,620,232

LAWN SPRINKLER

Douglas H. King, Short Hills, N. J.

Application March 10, 1950, Serial No. 148,808

1 Claim. (Cl. 299—65)

This invention relates to lawn sprinklers and more particularly to an automatic sprinkler of the nonrotating oscillating type as shown in my co-pending application filed March 10, 1950, Serial Number 148,807.

The object of the present invention is to provide a lawn sprinkler which will cover a large area with a uniform amount of precipitation.

Another object of the invention is the provision of a lawn sprinkler which will describe a substantially rectangular pattern of precipitation.

A further object of the invention is the provision of a lawn sprinkler, of the type shown in my co-pending application, provided with a plurality of spray heads or nozzles.

In the lawn sprinkler shown and described in my co-pending application, heretofore referred to, I have set forth a lawn sprinkler of the nonrotating automatic type which employs a single element having a suitable nozzle mounted on the free end thereof.

In the present invention I have provided a structure which includes a plurality of spraying elements and by so doing have provided a lawn sprinkler which will have a much larger effective square foot coverage but will retain all the advantages and the operating features of my improved sprinkler heretofore referred to.

The preferred structure of my present invention contemplates a rigid base member, having adjustably mounted thereon, a manifold or housing provided with an inlet and an outlet connection thereon, the outlet connection may be suitably capped when the sprinkler is to be used singly. The inlet or female connection is adapted to receive the male connection of a regulation garden hose.

Connected to the manifold, by suitable fittings, and projecting upwardly therefrom, at substantially right angles, are a plurality of flexible tubular members which may be constructed from neoprene, rubber, plastic or any tough resilient material having a long life. The upper or free ends of the tubular members are provided with suitable nozzles through which the water is emitted or sprayed.

Adjustably secured, on opposite sides of the manifold, are a pair of arms the free ends of which are arcuate in configuration and bear against each side of a web member or diaphragm the edges of which are secured to and extend the full length of the tubular members to provide a unitary structure. These arms may be adjusted upwardly or downwardly to control the operation of the tubular members and the consequent action of the nozzles attached thereto.

In operation, water under pressure, enters the manifold through the female connection, passes upwardly through the tubular members and is emitted from the nozzle or nozzles and due to the pressure and friction of the water as it traverses its course, the tubular members will be caused to oscillate back and forth and the frequency and the amplitude of the oscillations will be dependent upon the position of the arms of the web.

In a modified form of my invention I have provided a multiplicity of flexible tubular members all joined together, along their length, by means of a web and having a nozzle secured to the free end of each tubular member.

The invention will be clearly understood from the following detailed description when read in conjunction with the following drawings of which:

Fig. 1 is a perspective view of the sprinkler of my invention.

Fig. 2 is a side elevational view of the sprinkler shown in Fig. 1 and shows, in dotted lines, the position the sprinkler head or nozzle assumes when it is in operation.

Fig. 3 is a top plan view of Fig. 2.

Fig. 4 is a modified form of sprinkler unit which employs a multiplicity of flexible tubular members and a nozzle on each member.

Fig. 5 is a side elevational view of Fig. 4 and; Fig. 5A is a top plan view of one of the nozzles in Fig. 4.

Referring now to the drawings in which like reference characters indicate like parts. As shown in Figs. 1, 2 and 3 the sprinkler of this invention comprises a base 20, which may be formed of any suitable material but preferably of strong, heavy rod stock formed up into the configuration shown to provide a pair of runnerlike members 21 and 22, along the bottom and a raised central portion comprising the parallel members 23 and 24. The members 23 and 24 are spaced apart and are provided with downwardly extending loop portions 25 and 26, which are adapted to firmly embrace the extending nipple portions 27 and 28, of the manifold 29 which is provided with an inlet female connection 30 and a male connection 31, which serves as an outlet connection when the sprinklers are to be used in multiple, the cap CP therefore being removed so that an extension of hose may be attached thereto.

Mounted in the top of the manifold 29, by suitable fittings, and extending upwardly therefrom are a pair of spaced apart flexible tubular members 32 and 33, which are constructed of a tough resilient material such as neoprene, rubber, plastic or the like. The tubular members 32 and 33, are joined together along their length by a web portion 34 which is preferably molded integrally with the tubular members 32 and 33, to provide a single unitary structure.

As shown, there is secured in the top or free ends of the tubular members 32 and 33, a nozzle 35 which is substantially U-shaped in configuration, has an arcuate shaped outer surface and is provided with a plurality of apertures 36.

Adjustably secured to opposite sides of the manifold 29, by means of the wing nuts 37 and 38, are the upstanding arms 39 and 40 which are provided at their ends with arcuate portions 41 and 42, which as shown bear against the web 34, and which may be adjusted upwardly or downwardly, with respect thereto, to vary the effective length or amplitude of the members 32 and 33, thereby controlling the operation of the sprinkler by controlling the oscillation of the tubular members 32 and 33.

It will be readily apparent, from the foregoing description, that water under pressure introduced into the manifold 29, will pass upwardly through the members 32 and 33, and be ejected from the nozzle 35 through the apertures 36, and due to the fact that the flexible members 32 and 33 are constructed from resilient material, the force of the water will cause them to oscillate as shown in Fig. 2. It will be observed that the lower down that the arcuate portions 41 and 42 are positioned on the web portion 34, the greater the oscillation of the nozzle 35, with the resultant greater area covered by the water emitted therefrom, correspondingly the further upward the arcuate portions 41 and 42 are moved the less the nozzle 35, will oscillate and the smaller the coverage.

In Figs. 4 and 5 I have shown a modified type of structure in which the manifold 29, is provided with a multiplicity of upstanding flexible tubular members or necks 43, 44, 45, and 46, joined together along their length by web portions 47, 48 and 49, which are molded integral with the tubular members 43, 44, 45, and 46, form a single unitary structure. There is positioned in each of the free ends of the members 43, 44, 45, and 46, nozzles 50, 51, 52, and 53, which may be of the type shown in my co-pending application heretofore referred to or as shown in Fig. 5A and comprises a central aperture 54, having converging walls.

While I have shown and described the preferred embodiment of my invention it is to be understood that various changes and modifications may be made therein without departing from the spirit of the invention and I am only limited by the appended claim.

What is claimed is:

A lawn sprinkler comprising a base, a housing mounted on said base, a plurality of upstanding flexible tubular members mounted on said housing, a web portion located between said tubular members and connecting them together, an inlet connection on said housing communicating with said tubular members, nozzles secured in the free ends of said tubular members and means on said housing for controlling the movement of said tubular members.

DOUGLAS H. KING.

REFERENCES CITED

The following references are of record in the file of this patent:

UNITED STATES PATENTS

| Number | Name | Date |
| --- | --- | --- |
| 212,368 | Fiske | Feb. 18, 1879 |
| 374,960 | Gumaer | Dec. 20, 1887 |
| 573,933 | Travis | Dec. 29, 1896 |
| 1,546,714 | Buzbee | July 21, 1925 |